United States Patent Office 3,366,563
Patented Jan. 30, 1968

3,366,563
ELECTROPAINTING PROCESS AND PAINT
COMPOSITIONS THEREFOR
Donald P. Hart, Allison Park, and Roger M. Christenson, Gibsonia, Pa., assignors to Pittsburgh Plate Glass Company, Pittsburgh, Pa., a corporation of Pennsylvania
No Drawing. Filed Sept. 10, 1962, Ser. No. 222,674
8 Claims. (Cl. 204—181)

This invention relates to coating compositions adapted for use in electrodepositing films thereof on metals and to the methods whereby such compositions are produced and electrodeposited.

Electrodeposition of certain materials and the methods used for electrodepositing coatings have been known in the art for some time. For example, U.S. Patent 2,215,144 describes such a method for coating metal containers with certain waxy materials and U.S. Patent 2,530,366 relates to a method for electrodepositing certain ethylene polymers.

However, the types of materials heretofore used in electrodeposition processes have been necessarily limited because most substances and compositions which form desirable films and coatings cannot be satisfactorily applied in this manner. In addition, because of the lack of suitable compositions the processes used have been attended by serious disadvantages, such as poor flow of the deposited film and low throwing power, which have made the results obtained generally so unsatisfactory that electrodeposition methods of applying coatings have not been used to any appreciable extent.

It has now been discovered that certain coating compositions, as disclosed herein, possess very desirable properties when used in electrodeposition processes and that the coatings deposited therefrom using conventional electrodeposition techniques have excellent properties and can be applied easily and efficiently on a large scale.

The coating compositions of this invention contain a vehicle which comprises the reaction product of a drying oil fatty acid ester or a semi-drying oil fatty acid ester with an alpha, beta-ethylenically unsaturated dicarboxylic acid or an anhydride of such an acid; the reaction product may include in addition another ethylenically unsaturated monomer. The reaction products produced from the fatty acid ester, the acid or acid anhydride and the monomer, if such monomer is utilized, are neutralized to the extent of not greater than about 50 percent of their acidity and preferably in such a manner so as to form amide groups on at least part of the carbonyl carbon atoms of the product derived from the dibasic acid or anhydride.

In each instance, the reaction products of the present invention comprise the product or adduct of the drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed. Generally, drying oils are those oils which have an iodine value of above about 130, and the semi-drying oils are those which have an iodine value of about 90 to 130, as determined by method ASTM–D1467–57T. Examples of such esters include linseed oil, soya oil, safflower oil, perilla oil, tung oil, oiticica oil, poppyseed oil, sunflower oil, tall oil esters, walnut oil, dehydrated castor oil, herring oil, menhaden oil, sardine oil and the like.

Also included among such esters are those in which the esters themselves are modified with other acids, including saturated, unsaturated or aromatic acids such as butyric acid, stearic acid, linoleic acid, phthalic acid, isophthalic acid, terephthalic acid or benzoic acid, or an anhydride of such an acid. One inexpensive acid material which has been found to produce good results in many instances is rosin, which is composed of chiefly abietic acid and other resin acids. The acid modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using other polyols such as trimethylolpropane, pentaerythritol, sorbitol, and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" and "semi-drying oil fatty acid esters" as set forth herein are alkyd resins prepared utilizing semi-drying or drying oils; esters of epoxides with such fatty acids, including esters of diglycidyl ethers of polyhydric compounds as well as other mono-, di- and polyepoxides; semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of any of the above acids or anhydrides may also be utilized. Generally speaking, the anhydride or acid employed contains from 4 to 12 carbon atoms, although longer chain compounds can be used if so desired.

While the exact nature of the reaction product of the acid or anhydride with the fatty acid ester is not known with certainty, it is believed that the reaction takes place by addition of the unsaturated linkage of the acid or anhydride to the carbon chain of the oil. In the case of non-conjugated double bonds such as are present in linseed oil, the reaction may take place with the methylene group adjacent the non-conjugated double bond. In the case of oils having conjugated double bonds, such as tung oil, the reaction is probably of the Diels-Alder type.

The reaction between the acid or acid anhydride and the drying oil or semi-drying oil fatty acid ester takes place readily without the use of a catalyst and at temperatures in the range of about 100° C. to about 300° C. or higher, with the reaction generally being carried out between about 200° C. and about 250° C.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics. For this purpose, any ethylenically unsaturated monomer can be employed. Examples of such monomers include monoolefinic and diolefinic hydrocarbons such as styrene, alpha-methyl styrene, alpha-butyl styrene, vinyl toluene, butadiene-1,3, isoprene, and the like; halogenated monoolefinic and diolefinic hydrocarbons, such as alpha-chlorostyrene, alpha-bromostyrene, chlorobutadiene and similar compounds; esters of organic and inorganic acids, such as vinyl acetate, vinyl propionate, vinyl 2-chlorobenzoate, methyl acrylate, ethyl methacrylate, butyl methacrylate, heptyl acrylate, decyl methacrylate, methyl crotonate, isopropenyl acetate, vinyl alpha-bromopropionate, vinyl alpha-chlorovalerate, allyl chloride, allyl cyanide, allyl bromide, allyl acetate, dimethyl itaconate, dibutyl itaconate, ethyl alpha-chloroacrylate, isopropyl alpha-bromoacrylate, decyl alpha-chloroacrylate, dimethyl maleate, diethyl maleate, dimethyl fumarate, diethyl fumarate, and diethyl glutaconate; organic nitriles, such as acrylonitrile, methacrylonitrile, and ethacrylonitrile; and the like.

As is apparent from the above discussion and the examples set forth, which, of course, do not include all of the ethylenically unsaturated monomers which may be employed, any such monomer can be utilized. The preferred class of monomers used can be described by the formula:

(I) 

where $R_1$ and $R_2$ are hydrogen or alkyl, $R_4$ is hydrogen, alkyl or carboxyalkyl and $R_5$ is cyano, aryl, alkyl, alkenyl, aralkyl, alkaryl, alkoxycarbonyl or aryloxycarbonyl. The preferred compounds are styrene, substituted styrenes, alkyl acrylates, alkyl methacrylates, diolefins and acrylonitrile.

The reaction of the fatty acid ester, the acid or anhydride and any additional monomer or monomers can be carried out concurrently, that is, with each of the components of the reaction product being mixed together and heated to reaction temperature. However, because the monomer and the acid or anhydride are often quite reactive with each other, the oil or other fatty acid ester is preferably first reacted with the acid or acid anhydride, and then this product is subsequently reacted with any ethylenically unsaturated monomer or monomers employed. For example, a reaction product of linseed oil, maleic anhydride and styrene is made by first reacting maleic anhydride with linseed oil and then reacting the maleinized oil with styrene. When the process is carried out in this manner, the reaction of the additional monomer with the initial reaction product is usually carried out at somewhat lower temperatures, usually between about 25° C. and 200° C.

The proportions of each of the components going to make up the reaction product are ordinarily not critical. Generally speaking, between about 10 percent and about 45 percent by weight of the unsaturated acid or acid anhydride is reacted with from about 55 percent to about 90 percent by weight of fatty acid ester. In the presently preferred products, usually 15 percent to 30 percent of anhydride and 70 percent to 85 percent of oil ester are employed. If an ethylenically unsaturated monomer is incorporated in the reatcion product, it is typically used in amounts between about 5 percent and about 35 percent by weight, based upon the total weight of acid or anhydride and ester, with between 10 percent and 25 percent being used in those products preferred at present. Thus, in most instances the total composition of the reaction product may comprise from about 35 percent to about 90 percent by weight of the fatty acid ester and from about 10 percent to about 65 percent of the acid or anhydride and other monomer combined, with between about 6 percent and about 45 percent of the acid or anhydride always present.

The products produced in the above manner are comprised of polymeric chains of moderate length. The average molecular weight of the products to be used in electrodeposition should be low enough so that its flow characteristics at high solids are maintained, but high enough to provide adequate throwing power. The desirable molecular weight levels vary with the coating composition and conditions employed. Generally those products having molecular weights of up to 10,000 or somewhat higher have given the best results.

The product obtained by reacting the fatty acid ester and the dicarboxylic acid or anhydride and the ethylenically unsaturated monomer, if any, is believed to contain recurrent groups derived from the dicarboxylic acid or anhydride and which can be represented by the following structure:

(II) 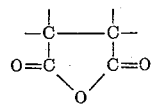

If the product in this form is mixed with water, the above groups are converted to the acid form which then has the structure:

(III) 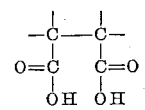

It is necessary to neutralize part of the acidic groups of the product in order to make it usable in electrodeposition processes; this is accomplished by reaction of up to half of the carboxyl groups in the above structure with a base. Inorganic bases, such as metal hydroxides can be used but it is preferred to employ organic bases such as amines. Neutralization with ammonia or a primary or secondary amine converts the structures shown in (II) above to structures having either amido groups, as in (IV) below, or ammonium groups, as shown in (V):

(IV) 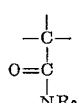

(V) 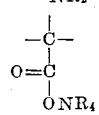

where the nature of R depends upon the amine employed and can be hydrogen, alkyl, cycloalkyl, alkenyl, aryl, aralkyl, alkaryl, or a substituted derivative of such groups. The nitrogen can also be part of a ring structure derived from a cyclic amine, in which case two of the R groups are attached to each other.

The extent of neutralization of the product is quite critical and must be carefully controlled. Thus, it is necessary that the acidity of the initial product be neutralized to a substantial extent in order to obtain compositions suitable for use in electrodeposition processes. Usually at least about 10 percent of the acidity must be neutralized, and it has been found that if more than about 50 percent is neutralized, the conductivity of the resulting baths utilizing such products is so high as to render the bath virtually useless for electrodeposition.

There is a correlation between the extent of neutralization and the pH of the neutralized product, so that measurement of pH provides a convenient method of determining the approximate extent to which neutralization has taken place. However, the pH for any given level of neutralization varies with the nature of the components of the coating composition, that is, the particular vehicle and pigment composition included therein.

It has been found that in order to achieve a product which is most useful for electrodepositing films, the neutralization with an amine should preferably be carried out in such a manner that amido groups are attached to at least part of the carbonyl carbon atoms in the above structure. By amido groups are meant trivalent nitrogen atoms attached with one valence to the carbonyl carbon atom with the other two valences being linked to hydrogen or carbon atoms in the same or different organic radicals. Unless this is done, the aqueous bath from which the coatings are electrodeposited may exhibit poor throwing power, which is a prime requisite for any good electrodeposition process. The term "throwing power" as commonly used with reference to electrodeposition processes means that property whereby each of the different areas of the electrode to be coated receives substantially the same density of deposit, even though such areas lie at appreciably different distances from the other electrode. This property is of primary importance in commercial instances wherein the article to be coated contains seams, crevices, and the like which will be imperfectly covered or not covered at all unless the throwing power of the bath used is adequate.

The extent to which amido groups are attached to the carbonyl carbon atoms can be varied substantially. Only a relatively small proportion of the total carbonyl carbons, as low as about 2 percent in certain instances, need be attached to amido groups in order to achieve products having good properties. Similarly, in some instances quite satisfactory and often preferred products are obtained when the maximum number of amido groups are present. The maximum number of amido groups that can be obtained under ordinary conditions is about half of the neutralized acidic radicals, inasmuch as whenever an anhydride structure is opened to attach an amido group to one of the carbonyl carbon atoms, the other usually undergoes a reaction whereby an ammonium ion is attached to the oxygen on the carbonyl group.

The structure of the groups having carbonyl carbons attached to amido groups is then believed to be as shown below, using for illustrative purposes the amido and ammonium groups derived when ammonia is used as the neutralizing amine:

(VI)
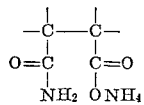

Under these circumstances, it is apparent that the extent of amide formation is dependent upon the extent of neutralization, and that not more than about 25 percent of the total carbonyl groups are attached to amido groups when the product is about 50 percent neutralized; when the product is about 10 percent neutralized the maximum amide formation is about 5 percent. Generally, in those products which have found the greatest utility at present for use in electrodeposition processes, the extent of amide formation has been about 2 percent to 25 percent, i.e., about 2 percent to 25 percent of the total number of carbonyl groups are attached to amido groups.

The neutralization of the acidity of the initial product with an amine results in at least some formation of amido groups when the reaction with the amine is carried out in any of several ways. One such method comprises the reaction of the initial product with a water solution of the amine. This method is simply and easily carried out, but in doing so, it is necessary to carry out the neutralization reaction at relatively low temperatures, i.e., at temperatures below about 70° C. If temperatures above this are used, the reaction produces substantially fewer amido groups in the neutralized product.

The neutralization reaction can also be carried out by first reacting the initial product with an amine in the absence of water, followed by addition of water to the mixture.

The neutralization reaction can be carried out using ammonia or any basic primary or secondary amine. Examples of such amines include alkyl amines, such as methylamine, ethylamine, propylamine, butylamine, amylamine, dimethylamine, diethylamine, dipropylamine, dibutylamine, and N-methylbutylamine; cycloalkyl amines, such as cyclohexylamine; unsaturated amines, such as allylamine, 1,2-dimethylpentenylamine and pyrrole; aryl amines, such as aniline; aralkyl amines such as benzylamine and phenethylamine; alkaryl amines, such as m-toluidine; cyclic amines, such as morpholine, pyrrolidine and piperidine; diamines, such as hydrazine, methylhydrazine, 2,3-toluenediamine, ethylenediamine, 1,2-naphthalenediamine and piperazine; and substituted amines, such as histamine, hydroxylamine, ethanolamine, and diethanolamine.

It has been found advantageous in many instances to effect part of the neutralization with certain solid amines, notably amino-alkyl-alkanediols, such as, for example, 2-methyl-2-amino-1,3-propanediol, 2-ethyl-2-amino-1,3-propanediol or 2-methyl-2-amino-1,4-butanediol. The films produced when a small amount of such amines are employed are considerably harder and often have improved water resistance. However, preferably not more than about 4 percent by weight of the resinous components of these solid amines are utilized, since they are relatively expensive and greater amounts do not further improve the film's properties and may even slightly decrease its water resistance.

The coating compositions which are used in electrodepositing films as described hereinafter comprise a vehicle of the type described above along with a pigment composition, both of which are dispersed in water. The pigment compositions used may be of any conventional type, comprising, for example, iron oxides, lead oxides, strontium chromate, carbon black, titanium dioxide, talc, barium sulfate and the like, as well as combinations of these and similar pigments. Color pigments such as cadmium yellow, cadmium red, phthalocyanine blue, chromic yellow, toluidine red, hydrated iron oxide and the like may be included if desired. There is often incorporated into the pigment composition a dispersing or surface active agent. If such a surface active agent is used, it should be of the non-ionic or anionic type, or a combination of these types. It is desirable to avoid the use of any cationic type agent. Usually, the pigment and the surface active agent, if any, are ground together in a portion of the vehicle to make a paste and this is blended with the vehicle to produce the coating composition.

It has been found especially important to regulate the ratio of pigment to vehicle in compositions which are used in electrodeposition processes. In most instances, the most desirable coatings are obtained when the coating composition contains ratios of pigment to vehicle of not higher than about 1.5 to 1 and preferably not higher than about 1 to 1. If the composition has too high a pigment to vehicle ratio, the electrodeposited films may exhibit very poor flow characteristics and in many instances are noncontinuous and therefore subject to deterioration.

There may also be included in the coating composition, if desired, additives such as antioxidants, for example, orthoamyl phenol or cresol (the commercial mixture of isomeric cresols is satisfactory). It is found especially advantageous to include such antioxidants in coating compositions which are used in baths which may be exposed to atmospheric oxygen at elevated temperatures and with violent agitation over extended periods of time.

In formulating the coating composition, ordinary tap water may be employed. However, such water may contain a relatively high level of metals and cations; while not rendering the process inoperative, the use of water containing these cations may result in variations in the properties of the bath when used for electrodeposition. Thus, it is often desirable to utilize deionized water, i.e., water from which free ions have been removed as by passage through an ion exchange resin, in making up the coating compositions of the invention.

Other additives which may be included in the coating composition if desired include, for example, wetting agents such as petroleum sulfonates, sulfated fatty amides, esters of sodium isothionates, or alkylphenoxypolyoxyethylene alkanols, as well as driers such as the linoleates, the naphthenates, the octanates and the tallates of such metals as lead, cobalt, manganese, iron, copper and zirconium. Other additives which may be employed include antifoaming agents, suspending agents, bactericides and the like.

In electrodeposition processes utilizing coating compositions as described above, the aqueous bath containing the composition is placed in contact with an electrically conductive metal anode and electrically conductive cathode. The coating is deposited upon the anode, so that the metal substrate to be coated is used as the anode. Upon the passage of electric current between the anode and the cathode, while in contact with the bath containing the coating composition, an adherent film of the coating composition is deposited upon the anode.

The conditions at which the electrodeposition process is carried out are those conventionally used in the electrodeposition methods employed heretofore. The applied voltage may be varied greatly and can be very low, e.g., 1 volt, or very high, e.g., 500 volts. It is typically between 50 volts and 350 volts. The current in the system depends on the area of the anode; the current density is usually between about 0.1 amp per square foot and 15 amps per square foot. Current tends to decrease somewhat during the electrodeposition.

The anode employed may be of any electrically conductive metal, such as iron, steel, aluminum, galvanized steel, phosphatized steel, zinc, and the like.

The concentration of the coating composition in the aqueous bath used in electrodeposition is not critical and relatively high levels of the coating composition can be used. However, it is ordinarily desirable to use as low a concentration of a coating composition as will give satisfactory results, and it is in this respect that the coating compositions of this invention are particularly advantageous. Baths containing as little as about 1 percent by weight of the coating composition in water can be employed, and in ordinary practice, the baths utilized usually contain between about 5 percent and about 10 percent by weight. Generally it is preferred not to use more than about 20 percent by weight of the coating composition in the bath.

The electrodeposition produces an adherent film which is very high in solids content, often 90 percent to 95 percent or even higher, which provides the important advantage that the film will not readily run or wash. The article so coated can be used, if desired, without additional baking or other drying procedures; if it is desired to carry out an additional baking or drying of the film, this is easily accomplished inasmuch as there is little or no solvent to be evaporated from the film. When this is done, baking temperatures of about 100° C. to 200° C. for 10 minutes to 30 minutes are usually used.

The optimum voltages and current densities used in depositing films of the coating compositions of this invention may vary depending upon the composition used and the particular characteristics desired in the finished film. Thus, it has been found that thicker films are generally obtained with higher voltages, and that greater throwing power results from use of higher voltages for given film thickness. Usually a maximum film thickness can be obtained with any given composition, and this depends upon the conductivity of the bath containing the composition, which in turn depends upon the extent of neutralization and amide formation in the vehicle comprising the composition. However, any of the compositions described above will produce satisfactory films having sufficient adherency and thickness using the ordinary methods and conditions heretofore used in electrodeposition processes.

Below are several specific examples of the invention. Examples 1 to 12 demonstrate the manner in which the vehicles are produced and incorporated into coating compositions; Examples 13 to 25 illustrate the electrodeposition of films of such compositions. These examples, however, are not to be construed as limiting the invention to their details.

EXAMPLE 1

A twelve liter reactor was charged with 1920 parts of maleic anhydride, 6080 parts of linseed oil and 60 parts of xylene. The reaction mixture was heated to 220° C. and held at that temperature for about 3 hours. It was then sparged with an inert gas while the temperature was raised to 250° C. and allowed to cool. A mixture of 200 parts of a 28 percent solution of ammonia in water and 2300 parts of deionized water were then mixed with 1500 parts of the above product at 77° F. The temperature rose to 96° F. After stirring for 1 hour there were added 280 parts of deionized water. The clear solution resulting had a pH of 6.8 and a solids content of 35 percent. The product was 45 percent neutralized.

A pigment composition was made by grinding the following for 16 hours in a steel ball mill to form a paste:

| | Parts by wt. |
|---|---|
| Vehicle made above (35 percent solids) | 420 |
| Strontium chromate | 75 |
| Carbon black (30 percent dispersion in water) | 250 |
| Red iron oxide | 1350 |
| Dispersing agent (combination oil-soluble sulfonate and non-ionic surfactant—Witco 912) | 15 |
| Deionized water | 440 |

To this pigment paste, which was of number 7 grind (Hegman), an additional 400 parts of the vehicle solution were added, whereupon the pigment composition produced was comprised of 9.72 percent vehicle solids and 50.9 percent pigment solids.

A water-dispersed coating composition was prepared from the above vehicle and pigment paste by mixing 400 parts of the vehicle solution (35 percent solids) with 118 parts of the pigment composition and 2482 parts of deionized water.

EXAMPLE 2

An epoxy ester of tall oil fatty acids was made by reacting 700 parts of the condensation product of epichlorohydrin and bisphenol A having an epoxide equivalent of 180 to 200 (Epon 828) with 2240 parts of tall oil fatty acids in the presence of 100 parts of high-boiling aromatic hydrocarbon solvent. The mixture was heated with agitation to 240° C. and held at that temperature for about 5 hours, at which time it had an acid value of 22.7. There were then added 700 parts of maleic anhydride, and this mixture was reacted at 225–250° C. for 1½ hours and then sparged with inert gas for 5 minutes. A solution of 360 parts of morpholine and 7716 parts of water was then mixed with 2670 parts of the hot resin. After an additional 42 parts of morpholine were added, the product was 43 percent neutralized and had a pH of 6.5 and a solids content of 25 percent.

A pigment paste was then made by grinding the following material for 24 hours in a steel ball mill:

| | Parts by wt. |
|---|---|
| Vehicle as in Example 1 (35 percent solids) | 1125 |
| Titanium dioxide | 1252 |
| Barytes | 1669 |
| Magnesium silicate | 169 |
| Strontium chromate | 183 |
| Carbon black | 69 |
| Bentonite water-dispersible clay thickner (Ben-O-Gel) | 16.5 |
| Deionized water | 825 |

The paste thus produced was of number 7 Hegman grind and was comprised of 63.1 percent pigment solids and 8.0 percent vehicle solids.

A coating composition was produced by mixing 3220 parts of the vehicle of this example (25 percent solids) and 273.5 parts of the above pigment paste along with 1000 parts of deionized water. Sufficient additional deionized water was then added to give a total solids content of 6 percent.

EXAMPLE 3

A reaction vessel was charged with 1600 parts of tung oil and 400 parts of fumaric acid and heated to 180° C. over a 1 hour period. The mixture was held at the reaction temperature for 1 hour, then sparged with an inert gas and cooled. The product was neutralized by adding 300 parts of the tung oil-fumaric acid adduct to 225 parts of deionized water containing 45 parts of morpholine. An additional 225 parts of water were added and the resulting solution, which was 49 percent neutralized, had a pH of 6.9.

A coating composition was prepared by mixing 400 parts of the above solution (40 percent solids) with 60 grams of the pigment paste of Example 1, along with sufficient water to make the total solids content of the composition 5 percent.

EXAMPLE 4

A mixture of 1920 grams of linseed oil and 480 grams of maleic anhydride was heated at 220° C. for 3 hours and then sparged with an inert gas and cooled to 150° C. There were then added 600 grams of styrene along with 6 milliliters of di(tertiary-butyl) peroxide and the resulting mixture maintained at 150° C. with agitation for 1 hour. An additional 3 milliliters of di(tertiary-butyl) peroxide were then added and the temperature raised to 160° C. for 2 hours. The product thus obtained had a solids content of 95 percent and an acid value of 71.6. Three hundred (300) parts of this warm resin were then mixed with 420 parts of deionized water and 25 parts of a 28 percent ammonia solution in water at a temperature of 91° F. This mixture was stirred for 2 hours and then 150 parts of water were added. The product thus obtained was 42 percent neutralized and had a pH of 7.2.

A coating composition was prepared using the above vehicle by mixing 430 parts of the vehicle (35 percent solids) with 105 parts of the pigment paste of Example 1 above and 1.5 parts of ortho-amyl phenol. To the mixture there were added 2465 parts of deionized water.

EXAMPLE 5

A mixture of 720 parts of linseed oil and 180 parts of maleic anhydride was reacted at 220° C. for 3 hours. The product was then reacted with 100 parts of dicyclopentadiene by refluxing the mixture for 7 hours at 180° C. to 222° C. The resulting resin was 98 percent solids. To a mixture of 275 parts of deionized water and 16 parts of morpholine there were added 150 parts of the above resin at 40° C. This product, which was 33 percent neutralized, was mixed with sufficient water to make a coating composition having a solids content of 5 percent.

EXAMPLE 6

A reaction vessel was charged with 300 parts of rosin acid, 40 parts of trimethylolethane, 1360 parts of linseed oil and 50 parts of xylene. The mixture was heated at 240° C. for 6 hours, at which time it had an acid value of 9. It was then sparged with an inert gas to remove the xylene and cooled. To 1649 parts of the resin thus prepared (100 percent solids) there were added 411 parts of maleic anhydride and this mixture was heated to 250° C. over a 3-hour period, held at that temperature for 15 minutes and cooled. One hundred and fifty (150) parts of this product was neutralized by mixing with 230 parts of water containing 16 parts of morpholine. An additional 2 parts of morpholine were then added, making the resin 34 percent neutralized, and sufficient water was added so that the product had a solids content of 35 percent.

A coating composition was produced from the above product by mixing 399 parts of the partially neutralized resin with 108 parts of the pigment paste of Example 1 above, along with 0.75 parts of cresol and 2493 parts of deionized water.

EXAMPLE 7

A reaction vessel containing 2240 parts of linseed oil acids was heated to 160° C. and then 288 parts of pentaerythritol and 0.63 part of stannous fluoride were added. The temperature was raised to 230° C. and held there for 1½ hours, whereupon the acid value of the mixture was 5.3. A mixture of 2365 parts of the ester thus produced and 593 parts of maleic anhydride was then heated to 250° C. over a 3-hour period, held at that temperature for 15 minutes and sparged with an inert gas. Neutralization of the product was carried out by reacting 300 parts of the product with 36 parts of a 28 percent ammonia in water solution and 520 parts of deionized water. The product, which was 48 percent neutralized, had a pH of 7.1.

EXAMPLE 8

A mixture of 400 parts of oiticica oil and 100 parts of maleic anhydride was heated to 150° C. and then heated slowly to 220° C. over a 1 hour period and cooled. One hundred and fifty (150) parts of the resin thus prepared was mixed with 230 parts of deionized water and 18 parts of a 28 percent ammonia in water solution. The temperature rose to 40° C. and the mixture was then heated to 46° C. for 20 minutes. This product, which had been 48 percent neutralized, was reduced to a solids content of 35 percent by the addition of water.

A coating composition was prepared by mixing 400 parts of the above 35 percent solids solution with 108 parts of the pigment paste of Example 1 above, along with sufficient water to make the total solids content of the resulting composition 7 percent.

The following example illustrates the manner in which the neutralization of the products of this invention can be carried out so as to either produce little or no amide groups in the resulting product, or so as to produce a product relatively high in amido groups. Part A of the following example shows the procedures used to attain a product in which the neutralized groups are all of the salt type, with few or no amido groups being present, whereas part B illustrates the manner in which the neutralization reaction can be made to produce a product in which up to about half of the neutralized acid groups contain amido groups, the electrodeposition of each of these compositions is shown in Examples 21 and 22 below. It should be noted that the methods set forth illustrate the extremes of the procedures which may be utilized, and that in the preferred practice of the invention a combination of the two is usually employed. That is, sufficient water is used along with the neutralizing amine so as to permit easy handling of the product, but the concentration of the amine in the initial reaction and the temperature is maintained sufficiently low so as to insure a substantial number of amido groups in the final product.

EXAMPLE 9

(A) Linseed oil and maleic anhydride were reacted in a weight ratio of 4 to 1 by heating at about 220° C. for several hours. A mixture of 500 parts of the product thus obtained and 1170 parts of deionized water was heated with agitation to 70° C. for 1 hour, at which time the infrared spectrum of the product showed that the band attributable to the anhydride group had disappeared. The mixture was then cooled to room temperature and 70 parts of morpholine were added. The product had a solids content of 31 percent and a pH of 6.8.

A coating composition was made from the above product by mixing 476 parts of the product with 54 grams of the pigment paste of Example 1 above and adding sufficient water to make the total solids content of the composition 5 percent.

(B) A linseed oil-maleic anhydride adduct was made as in part A above. To 500 parts of this product there were added 70 parts of morpholine and the mixture maintained at 70° C. for 1 hour. It was then mixed with 1170 grams of deionized water and sufficient morpholine (12 parts) added to make the pH 6.8. A coating composition was produced from this product in the same manner as in part A above, using the same pigment composition.

As discussed hereinabove, the weight ratio of the pigment to the vehicle affects the quality of the film produced by electrodeposition of the coating composition and it is desirable that this ratio be not higher than about 1.5 to 1. However, within this range, it has been found that compositions having higher pigment to vehicle ratios have higher throwing power and permit the use of higher voltages. In addition, they tend to produce harder films. The following example shows the preparation of otherwise identical compositions which have varying pigment to vehicle ratios and which are used in Examples 23 to 25 below to illustrate the foregoing observations.

EXAMPLE 10

(A) A reactor was charged with 2400 parts of linseed oil and 600 parts of maleic anhydride and heated with agitation to 250° C. over a 2-hour period. The mixture was held at this temperature for 15 minutes and then sparged with an inert gas. Seven hundred and fifty (750) parts of the reaction mixture thus produced were then mixed with sufficient deionized water and morpholine to produce a solution with a pH of 6.9 and a solids content of 35 percent. To produce a coating composition, 400 parts of this vehicle (35 percent solids) was mixed with 58 grams of the pigment paste of Example 1 above, and sufficient water was added to make the total solids content 5 percent.

(B) A coating composition was produced by mixing 400 parts of the vehicle of 35 percent solids made in part A above with 120 parts of the same pigment paste. Again, sufficient water to make the total solids content of the resulting composition 5 percent was added.

(C) Using the same vehicle and pigment paste as in parts A and B above, a coating composition was produced from 400 parts of vehicle and 185 parts of pigment and sufficient water to produce a coating composition having 5 percent solids.

It has been mentioned that it is desirable that the pH of the product be as low as possible consistent with the desired level of neutralization, and preferably under about 7.5. This is usually accomplished by adding a calculated quantity of the neutralizing base. However, in some instances, either due to an inadvertent addition of excess base or to the particular characteristics of the reaction system involved, the resultant product has a pH above the desired level. When this occurs, it has been found that the pH may be conveniently lowered by the addition of an additional quantity of the unneutralized or the slightly neutralized resin, i.e., the products of the above type which have had 20 percent or less of their acidity neutralized. The addition of the unneutralized or partially neutralized resin not only effectively reduces the pH to a desired level, but unexpectedly does not deleteriously affect the stability and other properties of the coating composition when used in an electrodeposition process. For example, it would be expected that addition of unneutralized resin to an amine-neutralized composition would tend to give unstable products with very low amide levels and high salt formations, which of course would tend to counteract the beneficial effect of the lowered pH in reducing the conductivity of the solution and would, in addition, decrease the throwing power of the bath. It has been found, however, that the compositions in which the pH has been adjusted in this manner are stable and produce satisfactory results when applied by electrodeposition. The following example illustrates the manner in which the pH is easily adjusted by the addition of unneutralized or slightly neutralized resin.

EXAMPLE 11

A resin was produced by reacting a 4 to 1 weight ratio of soybean oil and maleic anhydride at 250° C. for 5 hours. To 2500 parts of this resin there were added 340 parts of a 28 percent solution of ammonia in water, 3500 parts of water, and 120 parts of 2-methyl-2-amino-1,3-propanediol. The pH of the resulting solution was 8.8. There were then added 1250 parts of another resin produced from soybean oil and maleic anhydride in a similar manner to the original resin along with 1750 parts of water and 60 parts of 2-methyl-2-amino-1,3-propanediol. The pH of the resulting solution was then 7.25.

Similar results are obtained by adding a different unneutralized resin from that originaly used. Thus, for example, a linseed oil-maleic anhydride product, with or without an additional monomer such as styrene and in which up to 20 percent of the acidity has been neutralized by reaction withan amine, can be added to adjust a pH of a partially neutralized soybean oil or other product.

A related problem to that above is encountered in continuous electrodeposition of the coating compositions of this invention. Thus, there is a tendency to build up a concentration of cations in the electrodeposition bath and this is manifested by an increase in the pH of the bath. When this occurs, there is a subsequent deterioration in the quality of the deposited films. In addition to film degradation, the buildup in cations leads to a bath having higher conductivity, which in turn requires higher current densities to deposit films of a suitable thickness. The excess cations can be reduced and the pH lowered by the addition of coating compositions as in the above examples, but which are made from unneutralized or relatively less neutralized vehicles than are those used in making the original composition. It is desirable to use a composition of very high solids content, e.g., 90 percent or higher, and one in which the vehicle has been slightly neutralized, since this aids in dispersing the additional composition throughout the electrodeposition bath and also promotes high amide formation in the bath. Compositions made from vehicles which have up to 20 percent of their acidity neutralized are generally employed for this purpose. The following example illustrates the type of product which is added to the electrodeposition bath during continuous operation in order to maintain the pH at a predetermined level and to reduce the number of cations in the bath.

EXAMPLE 12

A reaction product was produced by heating linseed oil and maleic anhydride in a 4 to 1 weight ratio with agitation to 250° C. over a 2-hour period. The adduct produced was then used as the vehicle in making a composition as follows:

| | Parts by wt. |
|---|---|
| Vehicle | 241.5 |
| High-boiling aromatic solvent | 55.5 |
| Red iron oxide | 367.8 |
| Cresol | 3.4 |
| Strontium chromate | 14.1 |
| Carbon black | 27.1 |

The mixture of the above materials was heated to 200° F. and ground in a steel ball mill for 22 hours, at which time it was of a number 6½ Hegman grind. There were then added 438.5 additional parts of the vehicle and 18.4 parts of morpholine and this mixture was ground for ½ hour. The product was a paste of 95 percent solids, contained 36 percent pigment and had a pigment to vehicle ratio of 0.6 to 1.

During continuous electrodeposition operation, the above resin is added to the electrodeposition bath at about the same rate as the solids are removed by the electrodeposition and this maintains the pH at the predetermined level by removing excess cations from the bath. If the added resin contains less neutralizing base than is required; for instance, if in the above example no morpholine or less morpholine is used, the pH may drop excessively, e.g., below about 6.0. In such cases, additional base is added along with the unneutralized or slightly neutralized resin, as required to maintain the pH below the desired values, generally between 6.0 and 7.5.

The foregoing examples illustrate the method of producing vehicles and coating compositions in accordance with the invention. The following examples demonstrate the method and practice of carrying out the electrodeposition of the coating compositions described above, and illustrate the nature and advantages of the results obtained therefrom.

EXAMPLES 13 TO 25

In carrying out each of these examples, the coating composition employed was placed in a magnetically stirred, one-gallon polyethylene container. The electrodes used were 4 inch by 12 inch phosphatized steel (Bonderite) panels, and an electromotive force was applied between the electrodes from a 0–1000 volt industrial rectifier (Dresser Electric). The electrodes were spaced two inches apart in the bath and were immersed in the coating composition to a depth of six inches. The throwing power of a particular coating composition was determined by first carrying out an electrodeposition using a single panel as the cathode and another single panel as the anode, using sufficient voltage to give a film of 1 mil thickness on the anode. The single anode panel was then replaced with three panels joined at the bottom and separated at the top by shims 4 inches by 4 inches, beveled from ¼ inch in thickness at the top to ⅛ inch at the bottom. The electrodeposition was then repeated with the conditions which gave a 1 mil thick film. The throwing power of the bath is defined as that percentage of the immersed portion of the center panel of the anode upon which an adherent film had been deposited. The films were then dried by baking and the properties of the deposited film determined using standard procedures. Table I below sets forth the data obtained from the various tests carried out in the above manner.

as to obtain high amide levels in the product. It may be further noted in connection with these two examples that analysis of the films showed that the high amide level vehicle resulted in considerably more nitrogen content in the deposited film; the nitrogen in the deposited film is due chiefly to the amido groups on the neutralized product in the composition.

Examples 23 to 25 demonstrate the increased throwing power and film hardness obtained by using higher pigment to vehicle ratios. In all the above examples, the films produced were adherent and smooth and were of very high solids content as deposited.

According to the provisions of the patent statutes, there are described above the invention and what are now considered to be its best embodiments. However, within the scope of the appended claims, it is to be understood that the invention may be practiced otherwise than as specifically described.

We claim:

1. A method of coating a metal substrate which comprises passing an electric current between an electrically conductive metal anode and an electrically conductive cathode in contact with an aqueous bath containing a solubilized vehicle resin consisting essentially of the reaction product of an ester selected from the class consisting of drying oil fatty acid esters and semi-drying oil fatty acid esters and at least one acidic compound selected from the group consisting of anhydrides of alpha, beta-ethylenically unsaturated dicarboxylic acids, alpha, beta-ethylenically unsaturated dicarboxylic acids which form anhydrides, fumaric acid, and mixtures thereof, said reaction product having between about 10 percent and 50 percent of its acidity neutralized.

2. The method of claim 1 in which said solubilized vehicle resin is characterized by having at least part of the carbonyl carbon atoms derived from said acidic compound attached to amido groups.

3. The method of claim 1 in which said ester is a drying oil fatty acid ester and said acidic compound is maleic anhydride.

4. The method of claim 1 in which said reaction product is neutralized with ammonia or a basic or primary secondary amine.

5. A method of coating a metal substrate which comprises passing an electric current between an electrically conductive metal anode and an electrically conductive cathode in contact with an aqueous coating composition which comprises:
   (a) a solubilized vehicle resin consisting essentially of the reaction product of an ester selected from the class consisting of drying oil fatty acid esters and semi-drying oil fatty acid esters and at least one acidic compound selected from the group consisting of anhydrides of alpha, beta-ethylenically unsaturated dicarboxylic acids, alpha, beta-ethylenically unsaturated dicarboxylic acid which form anhydrides,

TABLE I

| Ex. No. | Coating Composition as in Example Number | Pigment to Vehicle Ratio | Concentration in Water (percent solids) | Bath pH | Applied EMF (volts) | Current (amps) | Bath Temp. (° F.) | Deposition Time (sec.) | Throwing Power (percent) | Baking Temp. (° F.) | Baking Time (min.) | Film Hardness (pencil) |
|---|---|---|---|---|---|---|---|---|---|---|---|---|
| 13 | 1 | 0.4/1 | 7 | 6.8 | 150 | 1.4–0.8 | 90 | 60 | 75 | 350 | 20 | 2B |
| 14 | 2 | 0.2/1 | 6 | 6.7 | 250 | 3.3–0.05 | 85 | 60 | 90 | 385 | 30 | 6B+ |
| 15 | 3 | 0.2/1 | 5 | 6.9 | 110 | 2.3–1.3 | 110 | 60 | 60 | 375 | 20 | B |
| 16 | 4 | 0.4/1 | 7 | 7.2 | 220 | 1.5–0.7 | 95 | 90 | 95 | 385 | 20 | F |
| 17 | 5 | | 5 | 7.3 | 160 | 1.0–0.35 | 84 | 60 | 50 | 350 | 20 | 6B |
| 18 | 6 | 0.4/1 | 7 | 7.0 | 280 | 1.3–0.25 | 80 | 60 | 90+ | 350 | 20 | 3B |
| 19 | 7 | | 5 | 7.1 | 200 | 1.7–0.7 | 85 | 90 | 70 | 350 | 20 | 4B |
| 20 | 8 | 0.4/1 | 7 | 7.0 | 190 | 2.5–0.15 | 90 | 60 | 90 | 350 | 20 | 4B |
| 21 | 9 (A) | 0.2/1 | 5 | 6.9 | 80 | 2.1–1.45 | 98 | 60 | 20 | 350 | 20 | 6B+ |
| 22 | 9 (B) | 0.2/1 | 5 | 6.95 | 150 | 1.5–0.85 | 98 | 60 | 55 | 350 | 20 | 5B |
| 23 | 10 (A) | 0.2/1 | 5 | 6.9 | 125 | 1.9–0.9 | 85 | 60 | 50 | 350 | 20 | 5B+ |
| 24 | 10 (B) | 0.4/1 | 5 | 6.9 | 150 | 1.5–0.7 | 85 | 60 | 75 | 350 | 20 | 2B |
| 25 | 10 (C) | 0.6/1 | 5 | 6.9 | 175 | 1.3–0.6 | 85 | 60 | 85 | 350 | 20 | F |

It may be noted from the above electrodeposition data that Example 16 demonstrates the increased hardness of the deposited film and the higher throwing power which can be obtained from the use of an additional ethylenically unsaturated monomer in the vehicle of the coating composition. Examples 17 and 19 indicate that unpigmented compositions tend to have lower throwing power than do compositions which include pigment. Examples 21 and 22 illustrate the increase in throwing power which is obtained by carrying out the neutralization reaction so fumaric acid, and mixtures thereof, said reaction product having between about 10 percent and about 50 percent of its acidity neutralized;
(b) pigment; and
(c) water the weight ratio of pigment to vehicle being not greater than about 1.5 to 1 and said water forming between about 80 percent and about 99 percent of the total weight of the composition, whereby there is deposited on said anode an adherent film of said coating composition.

6. The method of claim 5 in which said vehicle resin is characterized by having at least part of the carbonyl carbon atoms derived from said acidic compound attached to amido groups.

7. In a method of coating a metal substrate which comprises passing an electric current between an electrically conductive metal anode and an electrically conductive cathode in contact with an aqueous bath comprising a partially neutralized product of a fatty acid ester and an acidic compound, the additional step of adding to said bath a composition comprising a vehicle which comprises a reaction product of an ester selected from the class consisting of drying oil fatty acid esters and semi-drying oil fatty acid esters with at least one acidic compound selected from the group consisting of anhydrides of alpha, beta-ethylenically unsaturated dicarboxylic acids, alpha, beta-ethylenically unsaturated dicarboxylic acids which form anhydrides, fumaric acid, and mixtures thereof, said reaction product having up to about 20 percent of its acidity neutralized.

8. The step as in claim 7 in which the composition is added in amounts sufficient to maintain the pH of the water dispersed coating composition between about 6.0 and about 7.5.

References Cited

UNITED STATES PATENTS

| | | | |
|---|---|---|---|
| 2,215,167 | 9/1940 | Summer et al. | 204—38 |
| 2,263,923 | 11/1941 | Clocker | 260—404 |
| 2,898,279 | 8/1959 | Metcalfe et al. | 204—181 |
| 3,030,321 | 4/1962 | Lombardi et al. | 260—23 |
| 3,200,057 | 8/1965 | Burnside et al. | 204—181 |
| 2,033,132 | 3/1936 | Ellis | 260—18 |
| 2,414,712 | 1/1947 | Bolley | 260—405 |
| 3,230,162 | 1/1966 | Gilchrist | 204—180 |
| 3,251,790 | 5/1966 | Christenson et al. | 260—18 |
| 2,188,883 | 1/1940 | Clocker | 260—18 |
| 2,820,711 | 1/1958 | Kiebler et al. | 260—18 |
| 2,941,968 | 6/1960 | McKenna | 260—18 |
| 2,992,197 | 7/1961 | Boller | 260—18 |
| 3,050,478 | 8/1962 | Radlove | 260—18 |
| 2,934,506 | 4/1960 | Hicks et al. | 260—18 |
| 2,800,446 | 7/1957 | Freelenburgh | 204—181 |
| 2,386,634 | 10/1945 | Robinson | 204—181 |

FOREIGN PATENTS 699,414   12/1964   Canada.

DONALD E. CZAJA, *Primary Examiner.*

J. R. SPECK, JAMES A. SEIDLECK, *Examiners*

J. BATTIST, R. W. GRIFFIN, *Assistant Examiners.*